United States Patent
Parikh

(10) Patent No.: US 7,747,607 B2
(45) Date of Patent: Jun. 29, 2010

(54) DETERMINING LOGICALLY-RELATED SUB-STRINGS OF A STRING

(75) Inventor: Jignashu G. Parikh, Gujarat (IN)

(73) Assignee: Yahoo! Inc., Sunnyvale, CA (US)

( * ) Notice: Subject to any disclaimer, the term of this patent is extended or adjusted under 35 U.S.C. 154(b) by 321 days.

(21) Appl. No.: 11/592,919

(22) Filed: Nov. 2, 2006

(65) Prior Publication Data
US 2008/0077563 A1    Mar. 27, 2008

(51) Int. Cl.
G06F 7/00 (2006.01)
G06F 17/30 (2006.01)

(52) U.S. Cl. ........................... 707/713; 707/758
(58) Field of Classification Search .......... 707/3–5, 707/2; 715/234
See application file for complete search history.

(56) References Cited

U.S. PATENT DOCUMENTS

| | | | | |
|---|---|---|---|---|
| 6,571,239 B1 * | 5/2003 | Cole et al. | | 1/1 |
| 7,287,025 B2 * | 10/2007 | Wen et al. | | 1/1 |
| 7,321,892 B2 * | 1/2008 | Vadon et al. | | 1/1 |
| 2002/0178154 A1 * | 11/2002 | Shirota | | 707/3 |
| 2004/0068697 A1 * | 4/2004 | Harik et al. | | 715/513 |
| 2006/0253427 A1 * | 11/2006 | Wu et al. | | 707/3 |
| 2007/0038615 A1 * | 2/2007 | Vadon et al. | | 707/4 |
| 2007/0043703 A1 * | 2/2007 | Bhattacharya et al. | | 707/3 |
| 2007/0214131 A1 * | 9/2007 | Cucerzan et al. | | 707/5 |

* cited by examiner

Primary Examiner—John E Breene
Assistant Examiner—Giovanna Colan
(74) Attorney, Agent, or Firm—Hickman Palermo Truong & Becker LLP; Eric L. Sutton

(57) ABSTRACT

Techniques are provided for determining which sub-strings of a string are logically related to the string. In one embodiment, sub-strings of a string are considered logically related to the string if the sub-strings frequently appear as queries in the same sessions in which the string itself appears as a query. Information about strings and their logically-related sub-strings is stored in a "splits-dictionary". Once generated, the splits-dictionary may be used by the search engine for a variety of purposes, including the suggestion of alternative queries. The splits-dictionary may also be used by the search engine for other purposes, such as to affect the ranking of search results.

20 Claims, 2 Drawing Sheets

DETERMINING LOGICALLY-RELATED SUB-STRINGS OF A STRING

CROSS-REFERENCE TO RELATED APPLICATION

This application is related to and claims the benefit of priority from Indian Patent Application No. 2079/DEL/2006 filed in India on Sept. 21, 2006, entitled "DETERMINING LOGICALLY-RELATED SUB-STRINGS OF A STRING"; the entire content of which is incorporated by this reference for all purposes as if fully disclosed herein.

Field of the Invention

The present invention relates to automated search systems and, more specifically, to determining logically-related sub-strings of a string.

Background

To use a search engine, users typically formulate search queries, and then submit the search queries to the search engine. In formulating their search queries, users try to include words and phrases that they hope will produce search results that contain the information that they are looking for. Unfortunately, such user-formulated queries often do not produce the hoped-for results.

To assist the user, suggestion mechanisms have been developed that will respond to a user-formulated query by suggesting to the user various alternative search queries. If the user is not satisfied with the results of the user-formulated query, then the user may select and submit one of the suggested alternative queries. Suggestion mechanisms may provide the suggested alternative queries instead of or in addition to providing search results for the user-formulated query.

Of course, the usefulness of such suggestion mechanisms hinges on the relevance of the suggested alternative queries that they suggest. If the alternative queries suggested by a suggestion mechanism are not closely related to the topic in which the user is interested, then the suggestion mechanism will be of little value to the user.

In generating the alternative queries, suggestion mechanisms typically use text-based algorithms to detect words and phrases within the user-formulated query, and generate alternative queries based on the detected words and phrases. The words and phrases contained within search queries and generally referred to herein as "strings".

To generate useful alternative queries, some of the strings detected by those algorithms may need to be broken down in an intelligent manner. For example, for purposes like search relevance and contextual matching, the suggestion mechanism might generate alternative queries that increase coverage by breaking down stricter strings into more general sub-strings. However, this breaking down of strings can lead to irrelevant results if not done correctly.

For example, assume that a user-formulated query includes the string "parrot fish". A "parrot fish" is a type of "fish", not a type of "parrot". In this example, if the suggestion mechanism breaks the string "parrot fish" down to both "parrot" and "fish", then the alternative queries based on "parrot" alone are not likely to be useful to the user. Conversely, if the user-formulated query includes the term "parrot", alternative search queries that use the string "parrot fish" are not likely to be useful to the user. A given string may contain many logically-related substrings, a single logically-related substring, or no logically-related substrings. Thus, while the string "parrot fish" only has one logically-related substring (fish), the string "Sony camera" has two logically-related sub-strings: "Sony" and "camera".

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for determining which sub-strings of a string are logically related to the string. As used herein, the term "string" generally refers to a string of characters, and does not necessarily require multiple words. Similarly, the term "sub-string" general refers to a string of one or more characters that form part of another string, and does not necessarily require whole words. For example, "fish" is a sub-string of the string "parrot fish", and "elevat" is a sub-string of the string "elevator".

In one embodiment, sub-strings of a string are considered logically related to the string if the sub-strings frequently appear as queries in the same sessions in which the string itself appears as a query. Thus, if the query "fish" frequently appears in the same sessions as the query "parrot fish", then the sub-string "fish" is considered logically related to the string "parrot fish".

According to one embodiment, information about strings and their logically-related sub-strings is stored in a "splits-dictionary". Once generated, the splits-dictionary may be used by the search engine for a variety of purposes, including the suggestion of alternative queries. Thus, if a string is in a user-formulated query, then the sub-strings that are logically related to the string may be used in suggested alternative queries. Conversely, if a sub-string is in a user-formulated query, then the strings to which the sub-string is logically-related may be used in suggested alternative queries.

The splits-dictionary may also be used to affect the ranking of search results. For example, if a search is performed on "parrot fish", then the search results documents that only contain the sub-string "fish" may have their relevance score increased based on the fact that "fish" is a logically-related sub-string of "parrot fish". On the other hand, the search results documents that only contain the sub-string "parrot" may have their relevance score decreased based on the fact that "parrot" is not a logically-related sub-string of "parrot fish".

Process Overview

Figure 1:
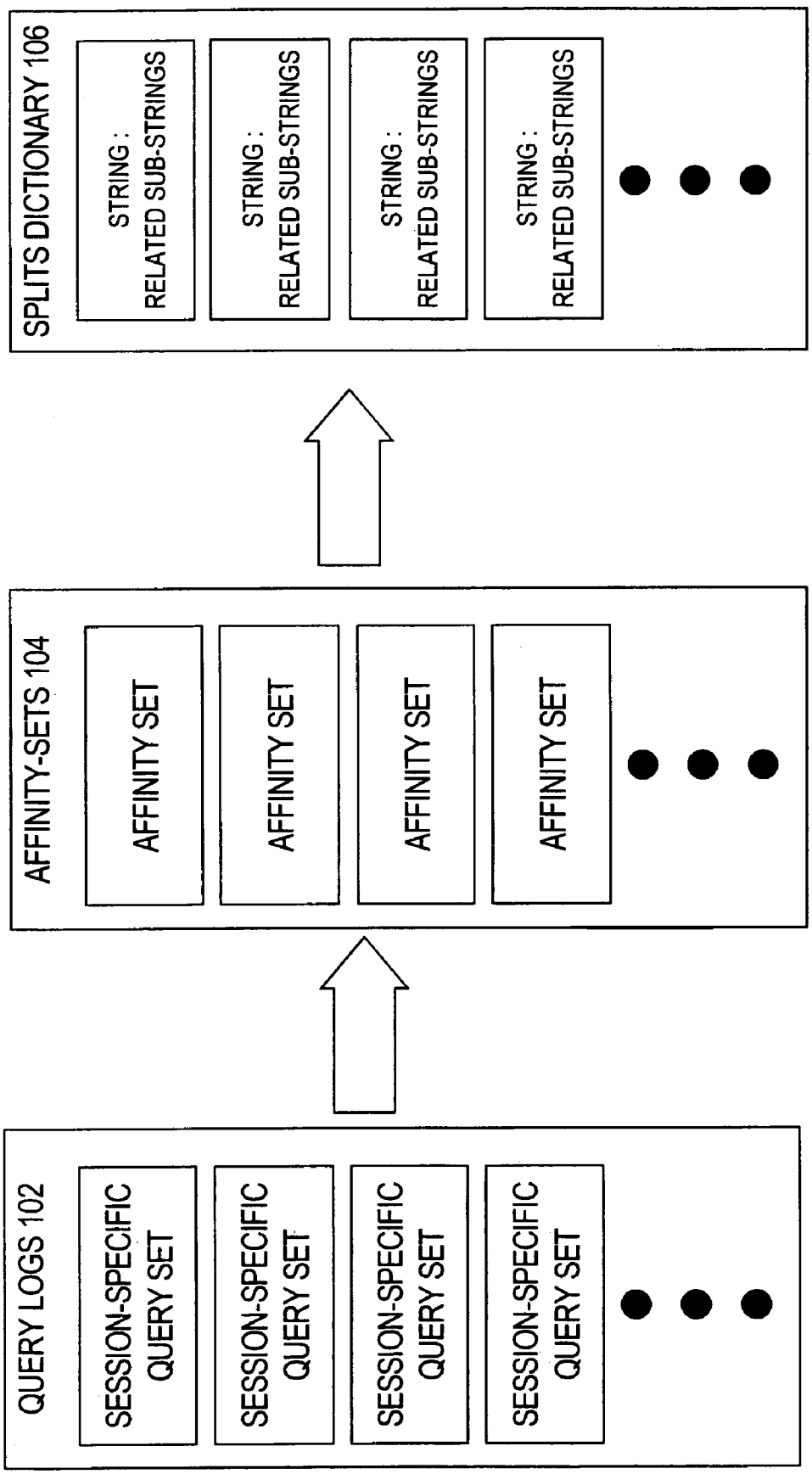
FIG. 1 is a block diagram illustrating information generated during a process of determining the logically-related sub-strings of a string, according to an embodiment of the invention.

Referring to FIG. 1, it is a block diagram illustrating phases of a process for determining which sub-strings of a string are logically-related to the string, according to one embodiment of the invention. In the embodiment illustrated in FIG. 1, query logs 102 are analyzed to identify session-specific query sets, where each session-specific query set represents those queries that were submitted by a user in a given session.

Based on the session-specific query sets, affinity-sets 104 are established. Each affinity set is associated with a query, and includes all queries that were frequently submitted in the same session as the associated query.

A splits dictionary 106 is then generated based on the affinity-sets 104. Each entry in the splits dictionary 106 corresponds to a string, and includes all sub-strings that are logically-related to the string. The splits dictionary 106 entry for a query string may be generated, for example, by removing from the affinity set of the query string all related queries that are not sub-strings of the query string.

As mentioned above, the splits dictionary 106 may be used by the search engine for a variety of purposes, including the generation of suggested alternative queries, and adjusting the ranking of documents in a set of search results. The various phases of the process of generating splits dictionary 106 shall be described in greater detail hereafter.

Sessions

In the context of searching, a session generally corresponds to a period of time during which a particular user is performing searches related to a particular topic. Of course, it is difficult for the search engine to know exactly when a user stops searching for information on one topic and begins searching for information on an unrelated topic. Therefore, search engines typically establish the boundaries of sessions based on certain rules of thumb.

For example, a search engine may define the start of a session to be when the search engine first receives a query from a user that is not currently in any session. The search engine may define the end of the session to be a half hour from the start of the session. Alternatively, the search engine may define the end of the session to be any period longer than twenty minutes during which the user associated with the session does not submit any queries.

These are merely examples of the various ways in which search engines define sessions. The techniques described herein are not limited to any particular mechanism for establishing the boundaries of sessions. For example, a search engine may provide a mechanism that allows users to explicitly identify the boundaries between sessions by indicating that they are changing the topic of information for which they are searching. As another example, boundaries between sessions may be identified by doing query categorization and establishing a boundary if a query's category changes from the previous query's category. For example, a session boundary may be established if someone queries for "nature parks" after queries related to the Automotive category (e.g. "honda", "cars", etc.).

Session-Specific Query Sets

As users submit queries to a search engine, the search engine may store the queries in one or more query logs 102. Such query logs may be used in a variety of ways to improve the search results provided by the search engine.

According to one embodiment, the search engine stores in the query logs 102, along with the queries, data that indicates the session in which the queries were submitted. The set of queries that were submitted during a particular session are referred to herein as a "session-specific query set". Typically, there will be a strong logical relationship between the queries that belong to a session-specific query set and the topic of the information for which the user was searching during the corresponding session. Consequently, there will be a strong logical relationship between the queries in a session-specific query set, since they were all used to search for information on the same topic.

Query Affinity

Query affinity refers to the likelihood that queries reflect the same user intent. Thus, if queries have a high affinity relative to each other, then it is likely that users are submitting the queries to retrieve information on the same topic. On the other hand, if queries have low affinity, then it is likely that users are submitting the queries to retrieve information on different topics.

According to one embodiment, an affinity determination mechanism determines query affinities based, at least in part, on session-specific query sets. For example, in one embodiment, affinity between a query A and a query B is determined based on the number (X) of session-specific query sets that include both query A and query B, as compared to the number (Y) of session-specific query sets that include query A and not query B, and the number (Z) of session-specific query sets that include query B and not query A. The higher the ratio of X to (Y+Z), the greater the affinity between query A and query B.

According to one embodiment, affinity is not assumed to be reciprocal. Thus, query A may have a high affinity to query B, while query B has a low affinity to query A. For example, assume that X is 50, Y is a 10, and Z is a thousand. Under these circumstances, query A has a high affinity to query B because of the 60 sessions that included query A, 50 sessions also included query B. However, query B would not have a high affinity to query A, because of the 1050 sessions that had query B, only 50 sessions also included query A.

Affinity Sets

The "affinity set" of a given query includes all queries whose affinity to the given query exceeds a given threshold. Thus, if the degree of affinity of query A to query B exceeds the given threshold, then query B is considered to belong to the affinity set of query A.

The queries that belong to the affinity set of a given query are referred to herein as "related queries". The related queries of a query need not have any textual relationship to the query to which they are related. For example, the related query set for the query "parrot fish" may include the queries "fish", "blood parrot fish", "tropical reef", and "Humuhumunukunukuapua'a". In this example, only the related queries "fish" and "blood parrot fish" have any textual overlap with the query "parrot fish". The queries "tropical reef" and "Humuhumunukunukuapua'a", on the other hand, have no textual overlap with the query "parrot fish".

The Splits Dictionary

A splits dictionary 106 may be generated based on affinity-sets 104. In one embodiment, each entry of splits dictionary 106 corresponds to the string of a query, and is generated by removing, from the affinity set of the query, all related queries that are not sub-strings of the query.

In such an embodiment, the splits dictionary entry for "parrot fish" is generated by removing from the affinity set of "parrot fish" all of the queries that are not sub-strings of "parrot fish". Assuming that the related queries of "parrot fish" are "fish", "blood parrot fish", "tropical reef", and "Humuhumunukunukuapua'a", the splits dictionary entry for "parrot fish" would include only the sub-string "fish".

Using the Splits Dictionary

According to one embodiment, the splits dictionary 106 contains entries that correspond to strings, where the entry for a given string includes the sub-strings that were determined to be logically-related to the given string. Splits dictionary 106 may be used by a search engine in a variety of ways to improve the searching experience of users.

For example, when a user-formulated query includes a particular string, the search engine may search for the entry for that string in the splits dictionary. From the entry, the search engine may determine the logically-related sub-strings for the string, and generate suggested alternative queries based on the logically-related substrings identified in the entry. Since the entry contains only logically-related sub-strings, it is less likely that the search engine will suggest alternative queries that are based on unrelated sub-strings of the user-formulated query.

As another example, the splits-dictionary may also be used to affect the ranking of search results. For example, if a search is performed on "parrot fish", then the search results documents that only contain the sub-string "fish" may have their relevance score increased based on the fact that "fish" is a logically-related sub-string of "parrot fish". On the other hand, the search results documents that only contain the sub-string "parrot" may have their relevance score decreased based on the fact that "parrot" is not a logically-related sub-string of "parrot fish".

These are just two examples of the various ways a search engine may make use of a splits dictionary to improve the experience of user that use the search engine. As another example, the search engine may generate abstracts for the documents in the search results based, in part, on the splits dictionary. For example, the search engine may include in the abstract excerpts that include logically-related sub-strings of the query, but not excerpts that include sub-strings that are not logically-related.

Alternatives

Various specific embodiments of the invention have been described above. However, the invention is not limited to the specifics of those embodiments. For example, the logically-related sub-strings of a string may be determined without generating affinity sets for queries. Instead, the search engine may store an affinity value for various string/substring combinations. Initially, the affinity values may be set to zero.

Then, every time the search engine encounters a string and its substring in the same session, the search engine may increment the affinity value associated with the corresponding string/sub-string combination. Using this technique, the search engine may consider a sub-string to be logically-related to a string if the affinity value for the string/sub-string combination exceeds a certain threshold.

Hardware Overview

Figure 2:
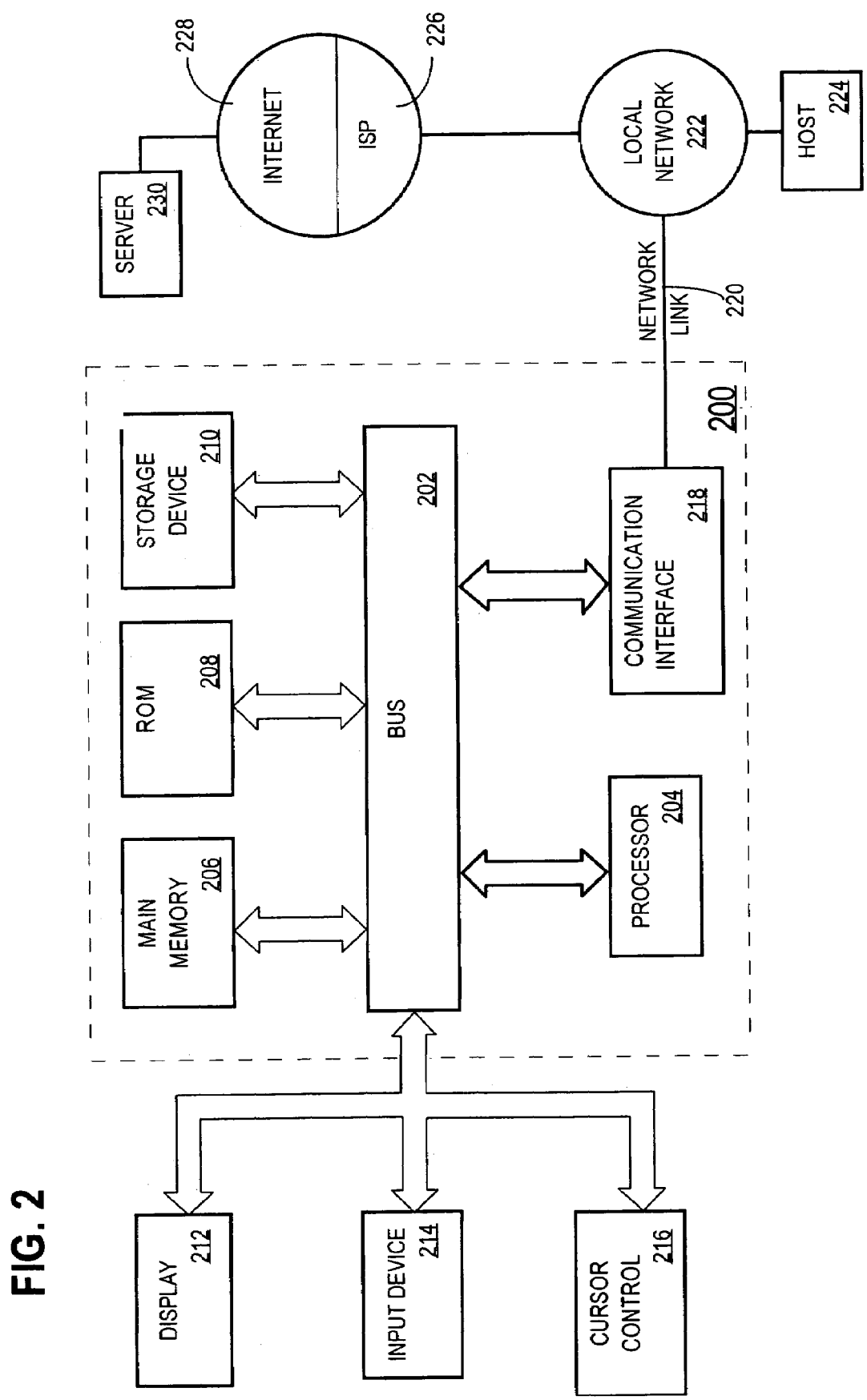
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining which sub-strings, of a plurality of sub-strings of a string, are logically related to the string, the method comprising the computer-implemented steps of:

monitoring which queries are submitted during a plurality of sessions;

forming an affinity set for a particular query that represents said string, wherein the affinity set for said particular query includes one or more other queries that were submitted in a same session as said particular query;

identifying, within the affinity set, which of the one or more other queries represent one or more sub-strings of the string;

for each sub-string of the plurality of sub-strings,
determining a first number of sessions, of said plurality of sessions, that include at least one query that represents the string and at least one query that represents the sub-string but not the string;
determining a second number of sessions, of said plurality of sessions, that include at least one query that represents the sub-string and no queries that represent the string;

determining which sub-strings, of said plurality of sub-strings, are logically related to said string based, at least in part, on both the first number of sessions and the second number of sessions;

wherein the method is performed by one or more processors.

2. The method of claim 1 wherein the step of monitoring which queries are submitted during a plurality of sessions includes monitoring which queries are submitted during a plurality of sessions between a search engine and users of the search engine.

3. The method of claim 2 further comprising:
storing data identifying the sub-strings of said string that are logically related to said string; and
wherein the search engine adjusts a ranking of search results based on said data.

4. The method of claim 2 further comprising:
storing data identifying the sub-strings of said string that are logically related to said string; and
wherein the search engine suggests alternative queries to a user based on said data.

5. The method of claim 4 wherein the search engine suggesting alternative queries to a user based on said data includes:
receiving, from said user, a user-formulated query;

determining that said user-formulated query contains said string;

reading said data to determine the sub-strings of said string that are logically related to said string; and generating one or more alternative queries based on the sub-strings of said string that are logically related to said string.

6. The method of claim 1 wherein the step of monitoring which queries are submitted during a plurality of sessions includes storing one or more query logs that (1) identify queries submitted by users of a search engine, and (2) indicate, on a query by query basis, the sessions in which said queries were submitted.

7. The method of claim 1, wherein:

the one or more other queries are other queries that satisfy a threshold degree of affinity to said particular query, wherein, for each of the other queries, a degree of affinity comprises a ratio of (a) a third number of sessions that include both said particular query and the other query to (b) a fourth number of sessions that include either said particular query or the other query but not both; and forming a splits dictionary entry for said string based on said affinity set by removing from the affinity set any queries that do not represent sub-strings of the string.

8. A volatile or non-volatile machine-readable storage medium storing one or more sequences of instructions which, when executed by one or more processors, causes the one or more processors to perform:

monitoring which queries are submitted during a plurality of sessions;

forming an affinity set for a particular query that represents said string, wherein the affinity set for said particular query includes one or more other queries that were submitted in a same session as said particular query;

identifying, within the affinity set, which of the one or more other queries represent one or more sub-strings of the string;

for each sub-string of the plurality of sub-strings,
determining a first number of sessions, of said plurality of sessions, that include at least one query that represents the string and at least one query that represents the sub-string but not the string;

determining a second number of sessions, of said plurality of sessions, that include at least one query that represents the sub-string and no queries that represent the string;

determining which sub-string, of said plurality of sub-strings, are logically related to said string based, at least in part, on both the first number of sessions and the second number of sessions.

9. A volatile or non-volatile machine-readable storage medium as recited in claim 8, wherein the one or more sequences of instructions, when executed by the one or more processors, causes the one or more processors to perform the monitoring which queries are submitted during the plurality of sessions by monitoring which queries are submitted during the plurality of sessions between a search engine and users of the search engine.

10. A volatile or non-volatile machine-readable storage medium as recited in claim 9, wherein the one or more sequences of instructions, when executed by the one or more processors, further causes the one or more processors to perform storing data identifying the sub-strings of said string that are logically related to said string; and wherein the one ore more sequences of instructions, when executed by the one or more processors, causes the search engine to adjust a ranking of search results based on said data.

11. A volatile or non-volatile machine-readable storage medium as recited in claim 9, wherein the one or more sequences of instructions, when executed by one or more processors, further causes the one or more processors to perform:

storing data identifying the sub-strings of said string that are logically related to said string; and wherein the one ore more sequences of instructions, when executed by the one or more processors, causes the search engine to suggest alternative queries to a user based on said data.

12. A volatile or non-volatile machine-readable storage medium as recited in claim 11, wherein the one or more sequences of instructions, when executed by the one or more processors, causes the search engine to suggest alternative queries to a user based on said data by performing:

receiving, from said user, a user-formulated query;

determining that said user-formulated query contains said string;

reading said data to determine the sub-strings of said string that are logically related to said string; and generating one or more alternative queries based on the sub-strings of said string that are logically related to said string.

13. A volatile or non-volatile machine-readable storage medium as recited in claim 8, wherein the one or more sequences of instructions, when executed by the one or more processors, causes the one or more processors to perform the monitoring which queries are submitted during a plurality of sessions by storing one or more query logs that (1) identify queries submitted by users of a search engine, and (2) indicate, on a query by query basis, the sessions in which said queries were submitted.

14. A volatile or non-volatile machine-readable storage medium as recited in claim 8, wherein the one or more other queries are other queries that satisfy a threshold degree of affinity to said particular query, wherein, for each of the other queries, a degree of affinity comprises a ratio of (a) a third number of sessions that include both said particular query and the other query to (b) a fourth number of sessions that include either said particular query or the other query but not both; and wherein the one or more sequences of instructions, when executed by the one or more processors, causes the one or more processors to perform:

forming a splits dictionary entry for said string based on said affinity set by removing from the affinity set any queries that do not represent sub-strings of the string.

15. The method of claim 7 wherein the threshold degree of affinity is greater than one.

16. A volatile or non-volatile machine-readable storage medium as recited in claim 14 wherein the threshold degree of affinity is greater than one.

17. The method of claim 1 wherein the step of determining which sub-strings, of said plurality of sub-strings, are logically related to said string includes:

determining which sub-strings, of said plurality of sub-strings, satisfy a threshold ratio of (a) the number of sessions that included said string to (b) the number of sessions that included the sub-string but not said string.

18. The method of claim 7, wherein one of the other queries is a sub-string of said particular query, wherein the third number of sessions for the one of the other queries is the first number of sessions, and wherein the fourth number of sessions for the one of the other queries is the second number of sessions.

19. A volatile or non-volatile machine-readable storage medium as recited in claim 8, wherein the one or more sequences of instructions, when executed by the one or more processors, causes the one or more processors to perform the determining which sub-strings, of said plurality of sub-strings, are logically related to said string by:

determining which sub-strings, of said plurality of sub-strings, satisfy a threshold ratio of (a) the number of sessions that included said string to (b) the number of sessions that included the sub-string but not said string.

20. A volatile or non-volatile machine-readable storage medium as recited in claim 14, wherein one of the other queries is a sub-string of said particular query, wherein the third number of sessions for the one of the other queries is the first number of sessions, and wherein the fourth number of sessions for the one of the other queries is the second number of sessions.

* * * * *

UNITED STATES PATENT AND TRADEMARK OFFICE
CERTIFICATE OF CORRECTION

PATENT NO. : 7,747,607 B2  Page 1 of 1
APPLICATION NO. : 11/592919
DATED : June 29, 2010
INVENTOR(S) : Jignashu G. Parikh It is certified that error appears in the above-identified patent and that said Letters Patent is hereby corrected as shown below:

Title Page; item (30);
Page 1 Insert --Foreign Application Priority Data
   September 21, 2006   (IN)    2079/DEL/2006--

In the Claims:

Claim 8, column 9, line 48 between which and of delete "sub-string" and insert --sub-strings--

Claim 10, column 10, line 1 between one and more delete "ore" and insert --or--

Claim 11, column 10, line 12 between one and more delete "ore" and insert --or--

Signed and Sealed this
Second Day of August, 2011

David J. Kappos
*Director of the United States Patent and Trademark Office*